Oct. 12, 1943. W. LOTTER 2,331,707
TOP AND BOTTOM FIRED BROILER
Filed March 18, 1940 3 Sheets-Sheet 3

INVENTOR
W. Lotter
By Bateman, Wright & Rainer
ATTORNEYS

Patented Oct. 12, 1943

2,331,707

UNITED STATES PATENT OFFICE 2,331,707

TOP AND BOTTOM FIRED BROILER

William Lotter, Cleveland, Ohio, assignor to American Stove Company, St. Louis, Mo., a corporation of New Jersey Application March 18, 1940, Serial No. 324,686

13 Claims. (Cl. 126—41)

The present invention is directed to a cooking range having a top and bottom fired broiling oven, and has as one of its objects the provision of novel and improved top and bottom burners for such an oven.

Another object of the invention is to provide a broiling oven having a stationary top burner and an easily and conveniently operated vertically adjustable combined bottom burner and broiling grid or pan.

Another and further object of the invention is to provide a top and bottom fired broiling oven in which the broiling grid or pan can be pulled outwardly from the oven to permit visual inspection of the article being cooked without thereby causing harmful interference by the bottom burner with the proper operation of the top burner.

Other and further specific objects, novel features of construction and improved results of the present top and bottom fired broiler will be pointed out in detail in the following description which is to be read in the light of the accompanying drawings.

Figure 1:
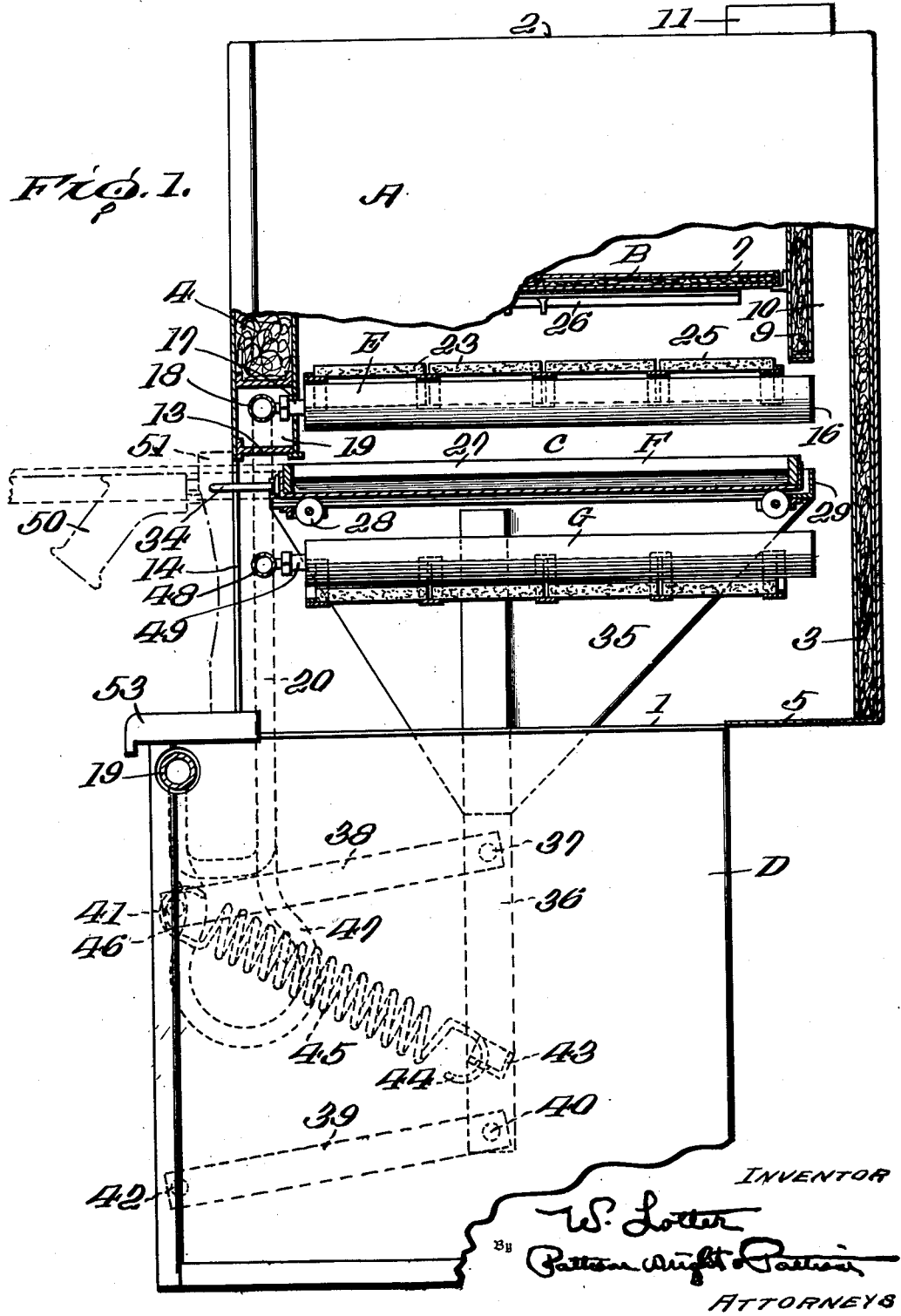
Figure 1 is a view in side elevation of a cooking range having therein a broiling oven built in accord with the inventive concept of the present invention, a portion of the view being broken away and illustrated in vertical section to more clearly illustrate the invention.
Figure 2:
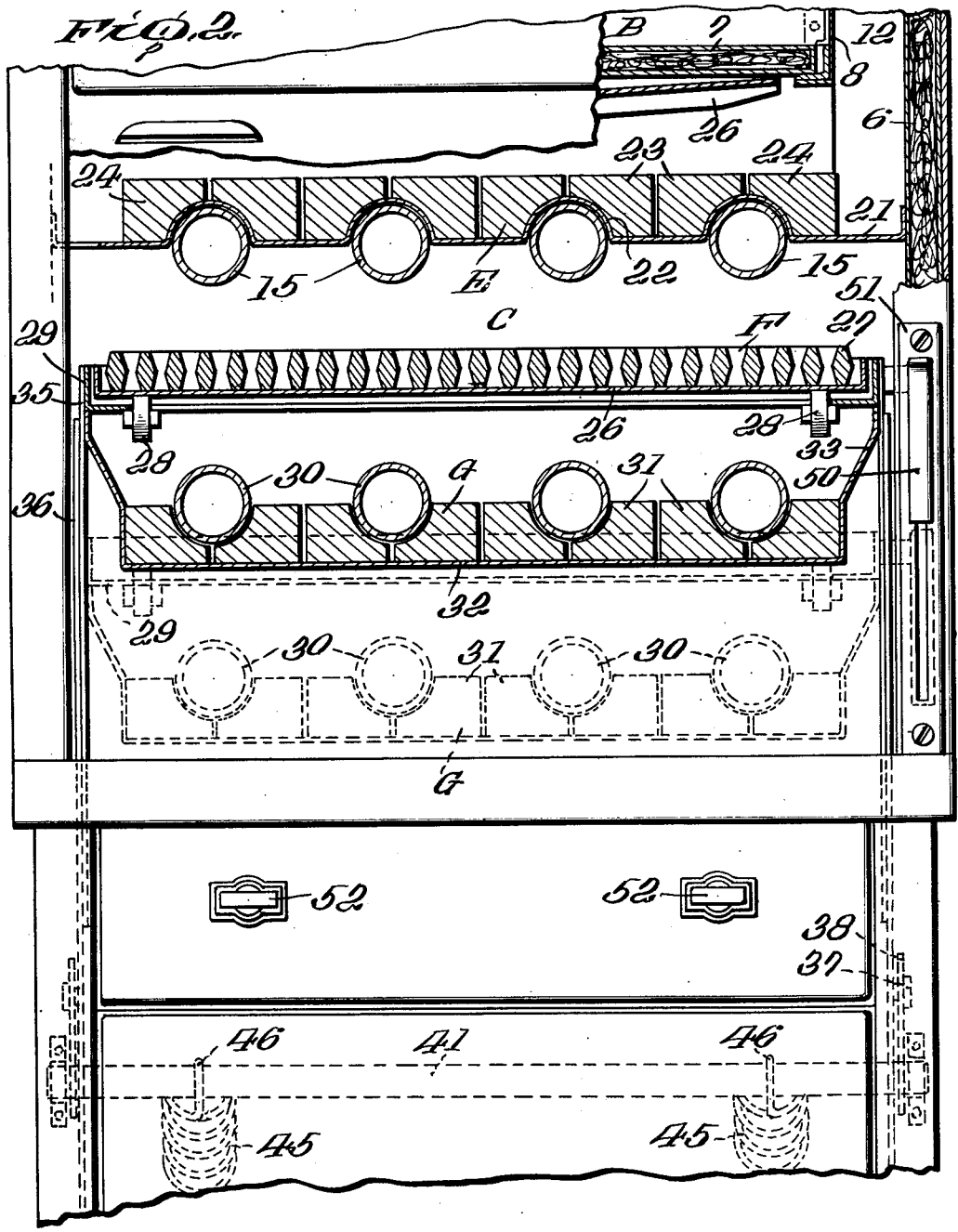
Figure 2 is a fragmentary front view of the construction illustrated in Figure 1 of the drawings, a portion of the view being broken away and illustrated in vertical section to better illustrate the construction.

Describing the invention in detail and using similar reference numerals and characters to designate like parts throughout the description, and having reference particularly to Figures 1 and 2 of the drawings, A designates a comparatively large housing which is preferably rectangular in form and has within its upper end an oven B ordinarily and commonly referred to in the trade as a baking oven and beneath this a broiling oven or chamber C. The large housing A is superimposed in respect to a bottom or base chamber or housing D which can be of any desired construction to have sufficient strength and rigidity to serve as a suitable support for said main oven housing. The bottom of the broiling chamber is in communication with said base housing through an enlarged bottom opening 1.

To prevent overheating the room in which the cooking appliance is used the oven containing housing A is provided with double spaced walls filled with suitable insulating material. The top of the housing appears at 2, the rear wall of the housing at 3, the front wall at 4, such small bottom as there is at 5, and the side walls at 6.

The baking oven bottom appears most clearly in Figure 2 at 7, one of its side walls at 8 while its rear insulated wall appears at 9 in Figure 1 of the drawings. It will be seen that the rear wall 9 of the oven is in spaced parallel relationship to the rear wall 3 of the main chamber to provide a vertical flue 10 the upper end of which as well as the upper end of the baking and cooking oven is in communication with a suitable outlet 11 positioned at the top and adjacent the rear of the main oven housing A. The flue passage 10 at its lower end is open and in communication with the broiling oven C. Reference to Figure 2 of the drawings discloses that the side walls 8 of the baking and cooking oven are in spaced parallel relationship to the side walls 6 of the main oven housing A to provide vertical flueways 12 the upper ends of which are in communication with the said outlet 11 while their lower ends are open and freely communicate with the broiling oven C.

The broiler top burners E are in the form of a plurality of open ended tubes 15 arranged in spaced parallel relationship and extending from front to rear of the broiling chamber with their rear ends 16 terminating for discharge immediately below the vertical flue passageway 10. The front ends of these tubes terminate adjacent the front wall 4 of the housing and into each of them extends a fuel jet 17 having communication with a suitable fuel supply manifold pipe 18 disposed in a chamber 19 lying between the double walls of the front housing wall 4. The burners illustrated are gas burners but other suitable gaseous fuel could be equally well utilized.

The fuel supply manifold 18 is connected with a main fuel supply pipe 19 in the lower housing or chamber D by a suitable conduit 20.

At suitable spaced intervals supporting arms 21 extend across the broiling chamber and are formed with semi-circular indentations 22 within which the upper halves of the burner tubes 15 are disposed. These arms support a plurality of radiants 23 which close the spaces between the burner tubes but the radiants 24 at the outer sides of the two outer burner tubes stop short of the side walls 6 of the housing A so as to provide in the lower portion of the broiling oven an unobstructed passageway having communications with the side flueways 12. The rear-most radiants 25 stop short of the rear wall 3 of the chamber so as to form no obstruction to communication of the lower end of the back flue 10 with both the upper and lower parts of the broiling oven.

In accord with the desires of the user and the particular type of cooking intended to be performed control of fuel delivery to the individual burner jets extending into the individual burner tubes can be such as to cause simultaneous delivery of fuel to all jets or individual delivery of fuel to each jet. Any desired combination of control of fuel to the jets can be provided so as to permit individual operation of any one burner tube if desired.

The upper broiling burners are quite closely adjacent the under side of the cooking oven bottom and in that the broiler burners, particularly the upper one, are utilized for the purpose of firing the cooking oven, provision is made in the form of a suitable heat insulator and deflector 26 at the under side of the cooking oven to prevent localized overheating of the cooking oven bottom and the bottom area of said oven.

The food or utensil supporting member is designated as an entirety at F and comprises a pan 26 within which is removably supported a grid 27 so as to permit the use of the grid to be optional.

The food or utensil supporting member or broiling grid and pan are supported for horizontal movement outwardly and inwardly in respect to the broiling oven upon suitable rollers 28 carried by the bottom walls of the L-shaped track or guideway angle irons 29 positioned in aligned relationship adjacent and extending along the opposite side walls 6 of the broiling oven. The track or guideway angle irons are supported independent of the side walls of the oven chamber, in a manner which will hereinafter be described, to permit them to be raised and lowered within the oven as will also hereinafter be explained.

The lower broiler burner which is designated as an entirety at G is of similar construction to the previously described upper broiler burner E. It comprises the elongated open ended tubes or pipes 30 arranged in separated parallel relationship and partially surrounded by radiants 31 in a manner similar to that described in respect to the upper broiler burner. The lower burner G and its radiants are supported upon suitable transversely extending brackets or cross arms 32 which are suspended from the track or guideway 29 by their vertical arm portions 33 the upper ends of which have suitable connection with said trackways. Thus it will be seen that the lower broiler burner and the broiling grid and pan will move upwardly and downwardly within the broiling oven as a unit whereas the broiling pan can be moved outwardly from the broiling oven independent of the lower broiler burner. At its front end the broiling pan is provided with a handle 34 to facilitate the outward and inward movement which is imparted thereto by the user of the range when it is desired to visually inspect the article being cooked or remove the broiling pan and grid so that they may be cleaned.

The construction which constitutes the support for the unitary lower broiler burner and broiling pan and grid will now be described. A plate 35 extends downwardly from each of the tracks or runways 29 and to the side walls of each plate there is suitably secured a vertically disposed arm or standard 36 which is sufficiently elongated to have its lower end disposed well within the lower housing or chamber D. To each of these arms or standards within the chamber D there is pivotally attached as at 37 an upper cross arm 38 while the lower cross arm 39 is pivotally attached to each of the standards 36 adjacent the lower end thereof as at 40. The outer ends of these cross arms are pivotally secured at the front of the lower housing D. The upper cross arms 38 are pivoted at their outer ends to a transversely extending shaft 41 while the outer ends of the lower cross arms 39 are pivotally secured as at 42.

The lower ends of the vertical arms or standards 36 are interconnected by a transversely extending brace 43 to which are suitably secured the inner and lower ends 44 of a pair of coil springs 45 the upper ends 46 of which encircle the aforementioned transversely extending shaft 41. The coil springs serve as counterbalancing means for the unit composed of the lower broiler burners and the broiling pan and grid. The springs tend normally to lift the unit and thereby reduce the manual effort incident to raising and lowering the unit and will also act to reduce the pull of gravity on the unit when the same is being lowered.

Fuel is fed to the lower broiler burners from the main supply manifold pipe 19 by a flexible conduit 47 which delivers fuel to the manifold 48 which carries the lower broiler burner jets 49.

An operating handle 50 positioned at the front of the broiling oven provides means for raising and lowering the lower broiler burners and broiling grid and pan. This handle is horizontally reciprocable upon an arm which has attachment to one of the runways or guideway angle irons 29. This arm passes from the broiling oven outwardly through a housing 51 to receive the handle upon its outer end beyond said housing. Spring means is provided for holding the handle 50 normally in its extreme outward position which causes the handle to interlock with the interior of the housing 51 to retain the unit in its set position. Inward movement of the handle against the spring tension releases the locking connection between the handle and the housing to permit the vertical adjustment of the unit. Detailed illustration of the construction comprising the unit operating handle and its interlocking relationship with the housing 51 is not included as this specific construction forms no part of the present invention in that any suitable operating handle and means to lock or secure the unit in its set position could be provided. The construction described is illustrated and described in detail in the copending application of Benjamin E. Meacham and William H. Frick, Serial No. 324,708, filed March 18, 1940, to which reference can be had to ascertain the exact detail of construction referred to.

Just as in respect to the upper broiling burners the delivery of fuel to the lower broiling burners can be controlled as desired so as to either deliver fuel simultaneously to all of the burner jets or to one or more of them individually. In the drawings I have illustrated only a single valve for controlling the delivery of fuel to the upper and lower broiler burners. These valves appear at 52 in Figure 2 of the drawings and are positioned at the front of the lower housing D immediately below the table-top-like or shelf-like portion 53 of said housing.

Figure 3:
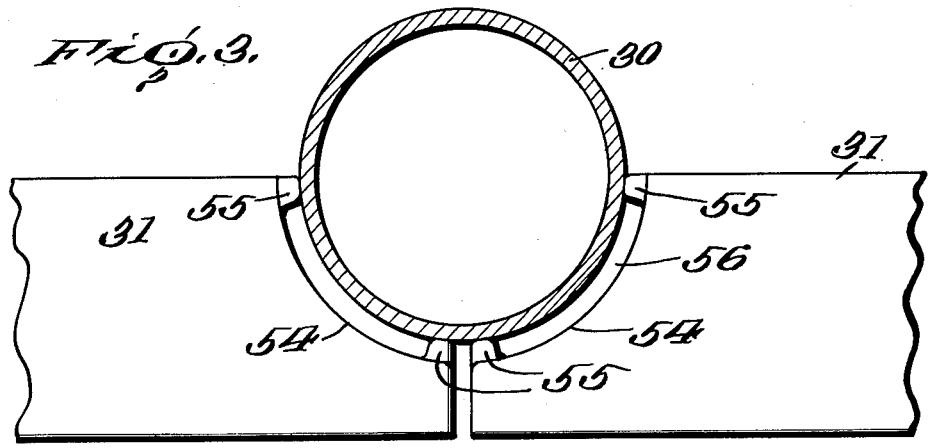
Figure 3 is an enlarged detail and transverse vertical sectional view through one of the broiler oven burners.

It has been found desirable to slightly space the burner tubes from the radiants and the construction utilized to accomplish this result is illustrated in detail in Figure 3 of the drawings where it will be seen that the semi-circular shaped portions 54 of those radiants adjacent the tubes are provided with a plurality of outwardly extending lugs 55 which engage the tubes so as to provide a space 56 between the tubes and the radiants.

By the provision of radiants or heat reflecting means it is possible to efficiently obtain the necessary cooking heat notwithstanding the fact that the flames of the burners are within a housing in the form of the heretofore described open-ended tubes. Ordinarily the food to be cooked in a broiler in the broiling oven is actually closely subjected to the flames of the broiler burners.

Figure 4:
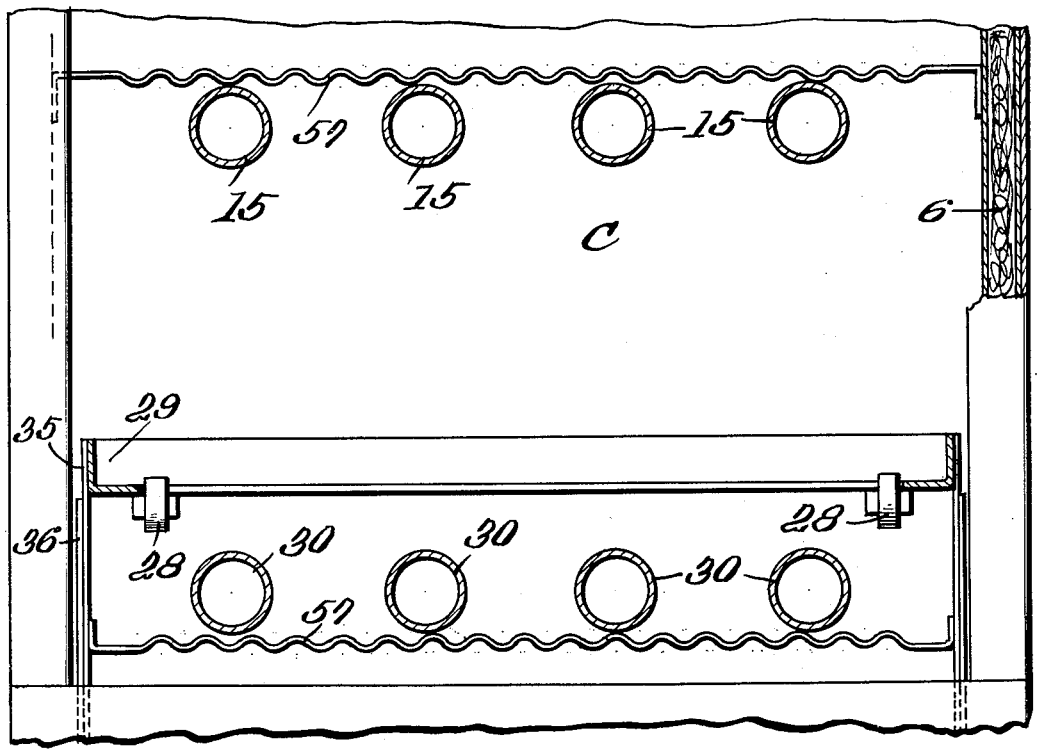
Figure 4 is a fragmentary vertical sectional view illustrating a modified form of top and bottom burner construction for use in the broiling oven illustrated in Figure 1 of the drawings.

It is not essential that the heat radiating means be in the form of radiant blocks such as illustrated in Figures 1 and 2 of the drawings. A modified construction is illustrated in Figure 4 of the drawings where it will be seen that metallic heat reflecting plates 57 are positioned above and below the upper and lower broiler burner tubes 15 and 30 respectively. The rest of the construction appearing in this figure of the drawings is similar to that heretofore described in respect to the preferred embodiment of the invention. It is considered sufficient to apply similar reference numerals to similar parts and to merely call attention to the fact that the broiling tray and grid are omitted from the illustration.

In Figures 1 and 4 of the drawings it will be seen that the runway and support for the broiling grid and tray extend across the rear end of the broiling oven as well as along its side walls.

Detailed description of the operation of the device is considered unnecessary as it will be apparent that the broiling grid or pan can be raised or lowered, as desired, in respect to the upper broiling burner as is necessary to the accomplishment of the best cooking. It will also be clearly apparent that as this element is raised and lowered the lower broiling burner will be moved with it as a unit and it will also be obvious that at any time the broiling pan and grid can be pulled outwardly from the broiling oven to permit visual inspection of the article being cooked.

It has been found heretofore in respect to top and bottom fired broiling ovens that the operation of the top broiling burner is seriously interfered with by reason of the products of combustion of the lower broiler burner mingling with the air supply of the top burners. Interference has been so great at times as to completely smother the upper broiler burner and this has been particularly so when the solid broiling pan or grid has been removed from its normal position above the lower broiler burner. Attempts have been made to correct the foregoing undesirable and defective operation of top and bottom fired broiling ovens but so far as I am aware these attempts have taken the form of complicated flueing arrangements. In my improved construction interference of the bottom burner with the operation of the upper burner is avoided and overcome in an extremely simple, cheap yet highly efficient manner and the proper operation of the broiler burners is assured irrespective of the position of one burner to the other and irrespective of whether or not a solid broiling pan or grid is interposed between the burners.

Specific changes in construction can be made over those illustrated in the drawings and that hereinbefore described without departing from the spirit of the invention, and the invention is to be limited only within the scope of the hereinafter appended claims.

I claim:

1. In a cooking appliance, a broiling oven having an outlet flue at its top adjacent its rear end, an upper burner in said oven comprising a plurality of elongated housings arranged in separated parallel relationship and extending from the front towards the rear of said oven and having rear ends communicating with said outlet flue, burner jets extending into the front ends of said housings and adapted to discharge fuel for combustion therein, a similarly constructed lower burner in said oven the housings of which have their rear ends positioned to communicate with said outlet flue through said broiling oven, a broiling grid or pan positioned above said lower burner and movable outwardly from said oven.

2. In a cooking appliance, a broiling oven having an outlet flue at its top adjacent its rear end, an upper burner in said oven comprising a plurality of elongated tubes arranged in separated parallel relationship and extending from the front towards the rear of said oven and having open rear ends communicating with said outlet flue, burner jets extending into the front end of said tubes and adapted to discharge fuel for combustion therein, a similarly constructed lower burner in said oven the tubes of which have their rear ends positioned to communicate with said outlet flue through said oven chamber, a broiling grid or pan positioned above said lower burner and movably outwardly from said oven, means to raise and lower said lower broiler burner and broiling grid or pan as a unit within said oven, means to secure said unit in its set position, and means permitting the outward movement of said broiling grid or pan in any of the set positions of said unit.

3. In a cooking appliance, a housing having therein a cooking or baking oven and a broiling oven therebeneath, an outlet flue passageway at the rear of said baking oven and communicating with the rear upper end of said broiling oven, said broiling oven having a front opening, a combined upper broiling and baking oven heating burner disposed in the upper end of said broiling oven and beneath the bottom of said baking oven, said burner comprising a plurality of elongated metallic housings the front ends of which are positioned adjacent the front of said broiling oven and the rear ends of which are positioned to discharge into the rear end of said broiling oven immediately beneath said outlet flue, a burner jet extending into the front end of each of said housings to discharge fuel for combustion therein, a similarly constructed lower broiling burner in the lower end of said broiling oven and the housings thereof having their rear ends positioned adjacent the rear end of said broiling oven and immediately beneath said outlet flue, and a broiling grid or pan positioned above said lower broiling burner and movable outwardly through the opening at the front of said oven.

4. A construction such as defined in claim 3, wherein said lower broiler burner and said broiling grid or pan are vertically adjustable as a unit within said oven and said broiling grid or pan is movable out of and into said oven independent of said lower broiler burner.

5. A construction such as defined in claim 3, wherein heat radiating means is positioned closely adjacent above and below the housings constituting the upper and lower broiler burners respectively.

6. A construction such as defined in claim 3, wherein the lower broiler burner and said broiling grid or pan are vertically adjustable as a unit within said oven, and heat radiating means is positioned closely adjacent above and below the housings constituting the upper and lower broiler burners respectively.

7. In a cooking appliance, a broiling oven having a flue outlet opening adjacent its upper end, a burner in the upper portion of said oven and a burner in the lower portion of said oven, both of said burners being positioned below said flue outlet opening, a broiling grid or pan supported intermediate said burners, the heat and hot products of combustion of said lower burner discharging into said oven and traveling upwardly through said oven and past said upper burner to discharge through said flue outlet, and said upper burner comprising means shielding said burner from interference with the operation thereof by products of combustion from the lower burner.

8. In a cooking appliance, a broiling oven having an outlet flue adjacent its upper end, a burner in the upper end of said oven, a burner in the lower portion of said oven and adapted to discharge its hot products of combustion thereinto, a broiling grid or pan positioned intermediate said burners, said upper burner comprising a plurality of elongated tubes extending from the front towards the rear of said oven and having open rear ends communicating with said oven outlet flue, and burner jets extending into said tubes to discharge fuel for combustion therein, said combustion being confined wholly within said tubes, whereby the hot products of combustion generated by said lower burner do not detrimentally interfere with an efficient and proper operation of the upper burner.

9. A construction such as defined in claim 1 wherein, a broiling grid or pan is positioned intermediate the upper and lower broiler burners, said grid or pan and said lower broiler burner being vertically adjustable as a unit within said oven, and said grid or pan being movable out of and into said oven independent of said lower broiler burner.

10. A construction such as defined in claim 1 wherein, heat radiating means is positioned closely adjacent above and below the housings constituting the upper and lower broiler burners respectively.

11. A construction such as defined in claim 1 wherein, a broiling pan or grid is positioned intermediate the upper and lower broiler burners, said grid or pan and said lower broiler burner being vertically adjustable as a unit within said oven, heat radiating means positioned closely adjacent above and below said upper and lower broiler burners respectively, and said heat radiating means being movable with said lower broiler burner.

12. A construction such as defined in claim 7 wherein, said broiling grid or pan and said lower broiler burner are vertically adjustable as a unit within said oven.

13. A construction such as defined in claim 7 wherein, said broiling grid or pan and said lower broiler burner are vertically adjustable as a unit within said oven, and said grid or pan is movable out of and into said oven independent of said lower broiler burner.

WILLIAM LOTTER.